United States Patent
Lin et al.

(10) Patent No.: US 9,131,737 B2
(45) Date of Patent: *Sep. 15, 2015

(54) DISPOSABLE GLOVES AND GLOVE MATERIAL COMPOSITIONS INCLUDING A COLORING AGENT

(75) Inventors: Ter-Hai Lin, Sugar Land, TX (US); Jeff Teng, Houston, TX (US); Ben Tseng, Eastbrunswick, NJ (US); Joe Wang, Roseland, NJ (US); Jerry Hsu, Closter, NJ (US)

(73) Assignee: Inteplast Group, Ltd., Livingston, NJ (US)

( * ) Notice: Subject to any disclaimer, the term of this patent is extended or adjusted under 35 U.S.C. 154(b) by 498 days.

This patent is subject to a terminal disclaimer.

(21) Appl. No.: 13/233,798

(22) Filed: Sep. 15, 2011

(65) Prior Publication Data

US 2013/0067637 A1     Mar. 21, 2013

(51) Int. Cl.
    *A41D 19/015*     (2006.01)
    *A41D 19/00*     (2006.01)
    *B32B 7/02*     (2006.01)

(52) U.S. Cl.
CPC ...... *A41D 19/0006* (2013.01); *A41D 19/01558* (2013.01); *A41D 2400/34* (2013.01); *A41D 2400/44* (2013.01); *A41D 2400/52* (2013.01); *B32B 7/02* (2013.01)

(58) Field of Classification Search
CPC ............. A41D 19/00; A41D 19/0006; A41D 19/0055; A41D 2400/52; C08L 2666/02; C08L 2666/28; C08L 2666/54; C08L 2666/66; C08L 2205/02; C08L 2314/06; C08L 2201/00; C08L 2201/10; C08L 2203/16; C08L 2203/162; C08L 2207/06; C08L 2207/062; C08L 2207/064; C08L 2207/066; C08L 2207/068; A61B 19/04; C08J 5/18; C08J 2323/08; C08F 2500/12; Y10S 428/00; Y10S 428/911; Y10S 428/907
USPC .................. 428/35.7, 500, 521, 523; 264/500, 264/328.1, 521, 523; 383/42; 2/159, 161.1, 2/167
See application file for complete search history.

(56) References Cited

U.S. PATENT DOCUMENTS 3,151,333 A     10/1964    Scholz
3,191,187 A *   6/1965    Comer et al. ..................... 2/167
(Continued)

FOREIGN PATENT DOCUMENTS

CN            201044775 Y     4/2008
EP              1260541 A1     11/2002
(Continued)

OTHER PUBLICATIONS

Abstract of JP11350219; Dec. 21, 1999.
(Continued)

*Primary Examiner* — Yan Lan
(74) *Attorney, Agent, or Firm* — Senniger Powers LLP

(57) ABSTRACT

The present invention generally relates to disposable gloves, ethylene-based thermoplastic materials for use in preparing disposable gloves, and methods for preparing ethylene-based thermoplastic materials for use in preparing disposable gloves. Generally, the present invention relates to non-medical and non-surgical disposable gloves suitable for use in food-service and industrial applications. In particular, the present invention is directed to disposable including a coloring agent incorporated into one or more of the ethylene-based polymer layers to indicate, for example, the size of the glove, the right- or left-handedness of the glove, and/or the presence of one or more additives (e.g., an antibacterial agent).

23 Claims, 4 Drawing Sheets

(56) References Cited

U.S. PATENT DOCUMENTS

| | | | |
|---|---|---|---|
| 3,739,400 A | 6/1973 | Colehower | |
| 3,866,245 A | 2/1975 | Sutherland | |
| 4,084,265 A | 4/1978 | Anfelt | |
| 4,302,852 A | 12/1981 | Joung | |
| 4,346,834 A | 8/1982 | Mazumdar | |
| 4,783,857 A | 11/1988 | Suzuki et al. | |
| 4,853,978 A | 8/1989 | Stockum | |
| 5,008,125 A | 4/1991 | Cale et al. | |
| 5,272,236 A | 12/1993 | Lai et al. | |
| 5,272,771 A | 12/1993 | Ansell et al. | |
| 5,451,439 A | 9/1995 | Bigg | |
| 5,596,052 A | 1/1997 | Resconi et al. | |
| 5,644,798 A | 7/1997 | Shah | |
| 5,655,226 A | 8/1997 | Williams | |
| 5,774,895 A | 7/1998 | Baldwin | |
| 5,792,531 A | 8/1998 | Littleton et al. | |
| 5,851,683 A | 12/1998 | Plamthottam et al. | |
| 5,911,665 A | 6/1999 | Heydarpour et al. | |
| 5,966,741 A | 10/1999 | Klecina | |
| 6,016,570 A | 1/2000 | Vande Pol et al. | |
| 6,017,997 A | 1/2000 | Snow et al. | |
| 6,107,454 A * | 8/2000 | Schmieg et al. | 528/487 |
| 6,124,428 A | 9/2000 | Schmieg et al. | |
| 6,166,142 A | 12/2000 | Zhang et al. | |
| D446,368 S | 8/2001 | Pizarro | |
| 6,347,408 B1 | 2/2002 | Yeh | |
| 6,355,733 B1 | 3/2002 | Williams et al. | |
| 6,578,729 B2 | 6/2003 | Grinberg | |
| 6,582,788 B2 | 6/2003 | Yeh | |
| 6,638,587 B1 | 10/2003 | Wang et al. | |
| 6,649,698 B1 | 11/2003 | Mehta | |
| 6,670,412 B1 | 12/2003 | Erderly et al. | |
| 6,846,530 B2 | 1/2005 | Porter et al. | |
| 6,893,730 B2 | 5/2005 | Moulton et al. | |
| 6,912,731 B2 | 7/2005 | Cass | |
| 6,955,276 B2 * | 10/2005 | Grinberg | 221/34 |
| D516,215 S | 2/2006 | Jones | |
| D517,696 S | 3/2006 | Jones | |
| D528,703 S | 9/2006 | Smedi | |
| 7,172,815 B2 | 2/2007 | Cook et al. | |
| D549,399 S | 8/2007 | Davis | |
| D567,452 S | 4/2008 | Wiley | |
| D570,554 S | 6/2008 | Raymond | |
| 7,971,276 B2 | 7/2011 | Eng et al. | |
| 8,117,672 B2 | 2/2012 | Lipinski | |
| 2003/0124354 A1 * | 7/2003 | Vistins | 428/411.1 |
| 2003/0205847 A1 | 11/2003 | Warneke et al. | |
| 2003/0226191 A1 | 12/2003 | Modha et al. | |
| 2004/0091519 A1 * | 5/2004 | Amdur, III | 424/443 |
| 2004/0182499 A1 | 9/2004 | Collier, IV et al. | |
| 2005/0204452 A1 | 9/2005 | Yung | |
| 2006/0073297 A1 | 4/2006 | Glick et al. | |
| 2006/0143767 A1 | 7/2006 | Yang et al. | |
| 2006/0218697 A1 | 10/2006 | Modha et al. | |
| 2006/0257674 A1 | 11/2006 | Lipinski et al. | |
| 2006/0276594 A1 | 12/2006 | German et al. | |
| 2007/0100047 A1 * | 5/2007 | Sukhadia et al. | 524/394 |
| 2007/0129496 A1 | 6/2007 | Shannon et al. | |
| 2007/0148432 A1 | 6/2007 | Baker et al. | |
| 2007/0160860 A1 | 7/2007 | Fiscus et al. | |
| 2008/0045647 A1 | 2/2008 | Kwalk | |
| 2008/0106005 A1 | 5/2008 | Fiscus et al. | |
| 2008/0181969 A1 | 7/2008 | Blanton et al. | |
| 2008/0226920 A1 * | 9/2008 | Parkinson et al. | 428/411.1 |
| 2008/0235850 A1 | 10/2008 | Cabauy et al. | |
| 2009/0298978 A1 | 12/2009 | Rotzinger | |
| 2010/0035035 A1 | 2/2010 | Defrang | |
| 2011/0030121 A1 | 2/2011 | Smalls | |
| 2011/0210571 A1 * | 9/2011 | Dan | 294/1.3 |
| 2011/0289653 A1 * | 12/2011 | Lin et al. | 2/167 |
| 2012/0047626 A1 | 3/2012 | Johnson | |
| 2013/0067635 A1 * | 3/2013 | Lin et al. | 2/161.6 |
| 2013/0067637 A1 | 3/2013 | Lin et al. | |

FOREIGN PATENT DOCUMENTS

| | | |
|---|---|---|
| EP | 1275664 A1 | 1/2003 |
| EP | 1049751 B1 | 12/2004 |
| JP | 11350219 A | 12/1999 |
| JP | D1188365 | 10/2003 |
| KR | 30041719.0001 | 3/2007 |
| WO | 97/44178 A1 | 11/1997 |
| WO | 02/28965 A1 | 4/2002 |
| WO | 02/094913 A1 | 11/2002 |
| WO | WO03/050178 * | 6/2003 |

OTHER PUBLICATIONS

Asian Hospital & Healthcare Management, "Medical Glove Manufacture—Going powder free", 4 pages, accessed on Feb. 29, 2012, <http://www.asianhhm.com/equipment_devices/gloves_powder_free.htm>.

Li et al, "Crystallization of partially miscible linear low-density polyethylene/poly(ethylene-co-vinylacetate) blends", Materials Letters, vol. 58, Issues 27-28, Nov. 2004, pp. 3613-3617.

Small et al., "The Characteristics of Polyethylene Film for Stretch and Cling Film Applications", Developments in Chemical Engineering and Mineral Processing, 2004, vol. 12, Issue 1-2, pp. 5-20.

Tomatsuri et al., "Metallocene Liner Low Density Polyethylene Blends for Pouch Materials in High-Speed Hot Liquid Filing Process", Metallocene-catalyzed polymers: materials, properties, processing & markets, 1998, p. 323.

* cited by examiner

DISPOSABLE GLOVES AND GLOVE MATERIAL COMPOSITIONS INCLUDING A COLORING AGENT

FIELD OF THE INVENTION

The present invention generally relates to disposable gloves, ethylene-based thermoplastic materials for use in preparing disposable gloves, and methods for preparing ethylene-based thermoplastic materials for use in preparing disposable gloves. Generally, the present invention relates to non-medical and non-surgical disposable gloves suitable for use in food-service and industrial applications. In particular, the present invention is directed to disposable gloves including a coloring agent incorporated into one or more of the ethylene-based polymer layers to indicate, for example, the size of the glove, the right- or left-handedness of the glove, and/or the presence of one or more additives (e.g., an antibacterial agent).

BACKGROUND OF THE INVENTION

Disposable plastic gloves are manufactured according to high quality standards to protect hands and fingers from exposure to bacteria, viruses, and other contaminants commonly found in medical and hospital settings, food preparation areas, biologic engineering laboratories, electromechanical and manufacturing work, inspection industries, automotive repair, household, and so on. Gloves are also used to protect against contamination of, for example, pharmaceuticals and foods that may be handled.

Disposable plastic gloves are manufactured with several considerations in mind, such as:
1. materials costs,
2. environmental impact,
3. durability,
4. comfort,
5. sanitation,
6. ability to form a protective barrier, and
7. use of hypo- or non-allergenic materials.

Disposable gloves are conventionally manufactured from a mixture of polymers, typically a low density polyethylene and high density polyethylene, because of the low cost of the materials, the inertness of the materials to a wide range of chemicals, and the flexibility of the gloves over a wide range of temperatures. However, the materials used in the manufacture of disposable polyethylene gloves may result in gloves that may not meet certain above-mentioned requirements. For example, gloves manufactured from a mixture of a low density polyethylene and high density polyethylene may not be comfortable and may tear easily.

Disposable gloves may also be manufactured from different materials, such as vinyl, natural rubber latex, or synthetic latex. While each material provides certain advantages that render gloves made therefrom useful, each material also suffers certain disadvantages, as set forth in the following table.

| Plastics | Pro | Con |
| --- | --- | --- |
| Polyethylene | Hypo-allergenic<br>Excellent chemical resistance<br>Economical<br>Low environmental impact<br>Capable protective barrier | Easy tear<br>Leakage at heat sealed seams<br>Not as comfortable as Latex<br>Poor dexterity |
| Vinyl | Economical<br>Good dexterity<br>Comfortable | Allergic reaction<br>Poor barrier capability<br>Not as comfortable as latex<br>Environmental impact |
| Natural Rubber Latex | Capable protective barrier<br>Comfortable<br>Excellent dexterity | Allergic reaction<br>Chemical resistance<br>Environmental impact |
| Synthetic Latex | Excellent Barrier capability<br>Durable<br>Excellent dexterity<br>High cost | Allergic reaction<br>Environmental impact<br>Not as comfortable as latex |

Suitable gloves have been manufactured from the above-mentioned materials, including disposable gloves constructed from a mixture of a high density polyethylene and a low density polyethylene. Other suitable gloves may be constructed of mixtures of ethylene-based polymers including a first ethylene-based metallocene-linear low density polyethylene (m-LLDPE) and at least one ethylene-based polymer selected from a second metallocene-linear low density polyethylene (m-LLDPE), an ethylene-vinyl acetate copolymer (EVA), and a linear low density polyethylene (LLDPE). While these gloves have proven effective for their various applications including, for example, as disposable food-service gloves, there remains the opportunity for further improvements that overcome one or more of the above-noted disadvantages including, for example, improvements in donning and gripping ability of the gloves and the strength characteristics of the gloves.

SUMMARY OF THE INVENTION

The present invention is generally related to disposable gloves constructed of a glove construction material including a plurality of ethylene-based polymer layers. The glove construction material is generally constructed of a plurality of films, each film including a plurality of ethylene-based polymer layers. The ethylene-based polymer layers are generally constructed of (I) a first metallocene-linear low density polyethylene (M-LLDPE), and (II) at least one ethylene-based polymer selected from the group consisting of a second metallocene-linear low density polyethylene (m-LLDPE), an ethylene-vinyl acetate copolymer (EVA), a linear low density polyethylene (LLDPE), and combinations thereof. The disposable gloves of the present invention are generally non-medical, non-surgical gloves and particularly suited for food-service and industrial applications.

One aspect of the present invention involves incorporating one or more surface modification agents into one or more of the ethylene-based polymer layers to provide improved donning ability of the wearer of the glove and also improved gripping ability.

Another aspect of the present invention generally involves incorporating a coloring agent into one or more of the ethylene-based polymer layers to indicate, for example, the size of the glove, the right- or left-handedness of the glove, and/or the presence of one or more additives (e.g., an antibacterial agent).

Briefly, therefore, the present invention is directed to a disposable glove comprising a first polymer flat film and a second polymer flat film heat-sealed to each other wherein the first film is a different color from the second flat film.

The present invention is further directed to a disposable glove comprising a glove construction material in the shape of a glove adapted for receiving a thumb, fingers, and/or a hand therein, and comprising a plurality of ethylene-based polymer layers. The glove construction material comprises (a) a first film and (b) a second film. The first film comprises (i) a coloring agent which imparts a first color to the first film, (ii) a first inner layer comprising (I) a first metallocene-linear low density polyethylene (m-LLDPE), and (II) at least one ethylene-based polymer selected from the group consisting of a second metallocene-linear low density polyethylene (m-LLDPE), an ethylene-vinyl acetate copolymer (EVA), a linear low density polyethylene (LLDPE), and (iii) a first outer layer comprising (I) a first metallocene-linear low density polyethylene (m-LLDPE), and (II) at least one ethylene-based polymer selected from the group consisting of a second metallocene-linear low density polyethylene (m-LLDPE), an ethylene-vinyl acetate copolymer (EVA), a linear low density polyethylene (LLDPE), and combinations thereof. The second film comprises (iv) a second inner layer comprising (I) a first metallocene-linear low density polyethylene (m-LLDPE), and (II) at least one ethylene-based polymer selected from the group consisting of a second metallocene-linear low density polyethylene (m-LLDPE), an ethylene-vinyl acetate copolymer (EVA), a linear low density polyethylene (LLDPE), and (v) a second outer layer comprising (I) a first metallocene-linear low density polyethylene (m-LLDPE), and (II) at least one ethylene-based polymer selected from the group consisting of a second metallocene-linear low density polyethylene (m-LLDPE), an ethylene-vinyl acetate copolymer (EVA), a linear low density polyethylene (LLDPE); the second film is free of any coloring agent which would impart said first color.

DETAILED DESCRIPTION OF THE PREFERRED EMBODIMENTS

Figure 1:
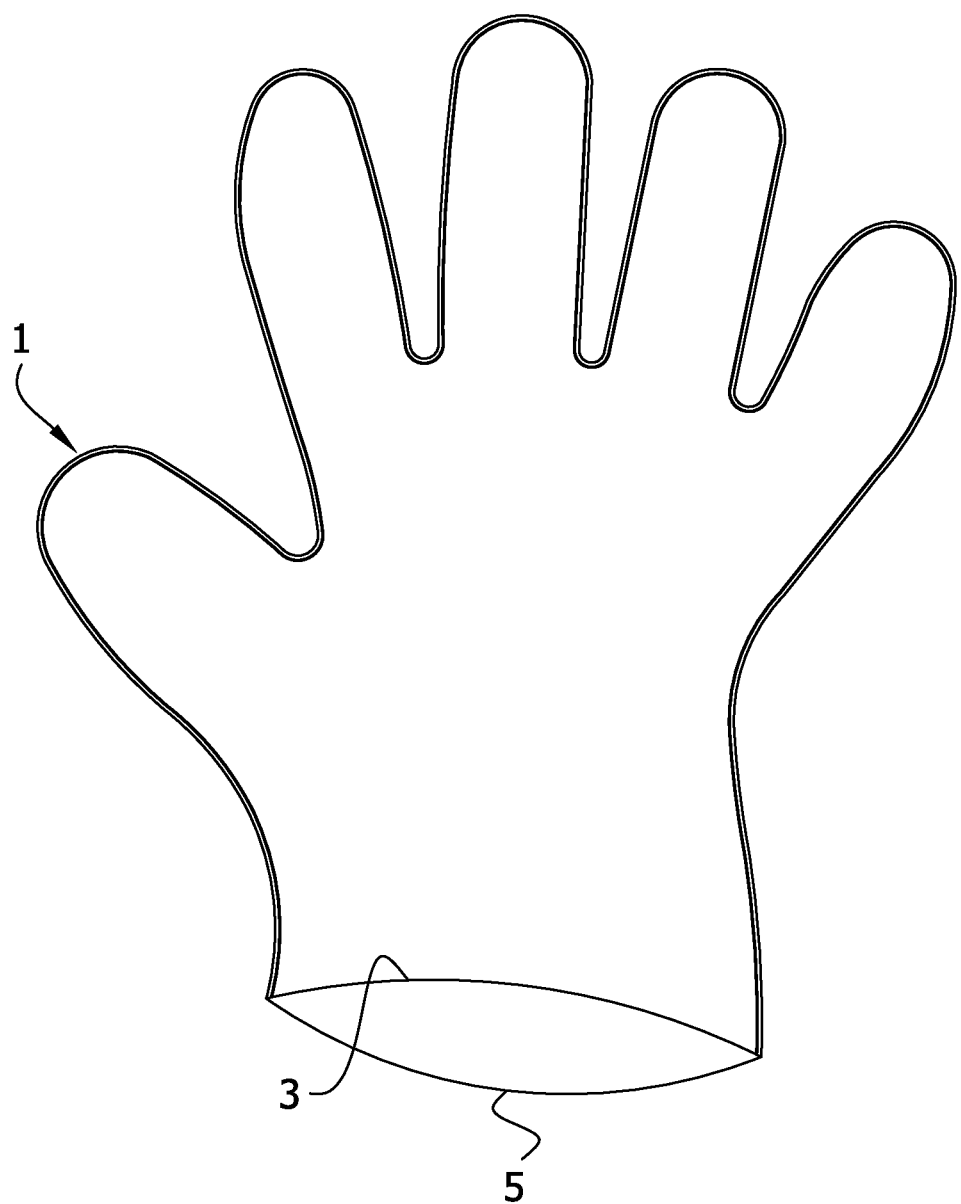
FIG. 1 depicts a disposable glove of the present invention.

Described herein are disposable gloves constructed of a glove construction material including a plurality of ethylene-based polymer layers. Generally, the present invention is directed to disposable gloves constructed of thermoplastic material, which contains a donning layer at the internal surface. For example, in one embodiment, the glove contains a thermoplastic material body in which a donning layer that contains a blend of two or more ethylene-based polymers and surface modification agents. It has been discovered that the application of a blend of two or more polyethylenes and surface modification agents to the internal surface of the glove may provide both damp and dry donning ability to the resulting thermoplastic glove.

Wearers of prior disposable gloves constructed of ethylene-based polymers and other materials often have difficulty in donning the gloves and also gripping objects. Gloves with insufficient grip properties may cause workers to grasp harder and exert more force when dealing with objects in the workplace, particularly oily or slippery objects. Workplace efficiency may become compromised as workers will become frustrated and more prone to mistakes and accidents. Glove coatings such as sponge nitrile rubber reduce this problem by absorbing much of the oil on the surface of the glove. However, the cost and other effects from this additional treatment may be increased and more risky. Various gloves of the present invention preferably contain one tacky surface. The tacky surface is preferably on the external portion, or surface of the glove that comes into contact with the object to be grasped by the wearer and provides hand stability and appropriate grip properties during use. Tacky regions have numerous utilities, but principally function to provide finger holds or areas of demarcation in the mitt without having to define finger or thumb areas or otherwise provide border areas that would increase processing expense. The tacky areas also allow for places to grip or securely position the mitt or glove on the user's hand. The tacky exterior surface of the gloves of the present invention is provided by incorporating one or more surface modification agents as detailed elsewhere herein into the outer ethylene-based polymer layers of the glove construction material to provide a tacky exterior surface of the glove that comes in contact with the object to be grasped by the wearer. Along with tacky exterior surfaces, gloves of the present invention include smooth interior surfaces that come in contact with the wearer's hand during donning of the glove and thus provide ease in donning of the glove. The ease in donning of the glove is provided by incorporating one or more surface modification agents into the inner ethylene-based polymer layers that come in contact with the wearer's hand during donning.

In addition to easier donning and improved tackiness for grasping objects, gloves of the present invention provide improved strength characteristics as compared to other ethylene-based disposable gloves including, for example, ethylene-based gloves constructed of high-density polyethylene (HDPE). Although HDPE-based gloves have proven effective in various applications, including food-service applications, improvements in certain strength characteristics of these gloves would be desired. Gloves of the present invention constructed of layers including mixtures of m-LLDPE polymers provide improved strength characteristics over conventional HDPE-based gloves. One aspect of the present invention that provides this improved strength is the utilization of multiple films, each film constructed of a plurality of ethylene-based polymer layers.

A further advantage of the disposable gloves of the present invention is that the ethylene-based polymers allow for preparation of gloves of at least comparable strength and performance characteristics at a reduced cost as compared to similar performing gloves that are constructed of more costly materials. For example, vinyl-based (e.g., polyvinylchloride (PVC)-based) gloves have proven to exhibit suitable strength characteristics, but the cost of vinyl-based materials has increased in recent years, while the cost of ethylene-based polymers has decreased. Accordingly, as of the time of applicants' invention, ethylene polymer-based gloves can be prepared at a reduced cost as compared to similar performing vinyl-based gloves. The ethylene-based polymer gloves of the present invention also provide one or more advantageous features as compared to disposable gloves constructed of other conventional glove construction materials. For example, latex disposable gloves generally exhibit one or more desirable characteristics (e.g., barrier protection, strength/durability, elasticity, and fit/comfort) and can be prepared at relatively low cost. Ethylene-based gloves of the present invention exhibit these advantageous features, but also typically exhibit superior puncture resistance as compared to latex-based gloves while also avoiding user allergy issues that can be seen with latex-based gloves. With respect to nitrile-based gloves (e.g., acrylonitrile and butadiene), ethylene-based polymer gloves of the present invention at least equal the nitrile-based gloves with regard to performance characteristics (e.g., barrier protection and strength/durability) while also providing advantages over nitrile-based gloves in terms of other features (e.g., elasticity and fit/comfort), while also being prepared at lower cost than nitrile-based gloves. The ethylene-based polymer gloves of the present invention also exhibit at least comparable performance characteristics as compared to polyurethane-based gloves, while being prepared at lower cost. Accordingly, the gloves of the present invention provide many advantages over conventional gloves generally and, more particularly, provide many advantages by virtue of at least matching and often exceeding performance characteristics of conventional disposable gloves, while being prepared at lower cost.

Further in accordance with the present invention, the films comprising the ethylene-based polymer layers are constructed of a plurality of ethylene-based polymer layers. In various embodiments, the films include inner and outer ethylene-based polymer layers and, in various other embodiments, further include middle layers disposed between the inner and outer layers. It has been discovered that this multi-layer arrangement provides films that exhibit improved strength characteristics as compared to films of similar thicknesses constructed of, for example, high-density ethylene-based polymers and vinyl polymers and, thus, allow for preparation of glove construction materials and gloves of improved strength characteristics without requiring thicker gloves. This represents an advance in the art since thinner gloves are generally preferred for purposes of wearer comfort, dexterity, and also economics since as thickness of the gloves and films increases the cost associated with film and glove manufacture likewise increases.

As used herein, the term "disposable" is used in its ordinary sense to mean an article that is disposed of or discarded after a limited number of usage events, preferably less than 10, more preferably less than about 5, and most preferably less than about 2 entire usage events. As used herein, the term "glove" refers to a covering adapted for a wearer's hand, thumb, and/or one or more fingers of a wearer. In various embodiments, "glove" refers to a covering for a wearer's hand, thumb, and each finger. In various other embodiments, "glove" refers to a covering for a portion of a wearer's hand and the wearer's fingers, or a covering for only one or more of the wearer's fingers and/or thumb. Such coverings that do not cover the entire hand and each finger and thumb of the wearer are often referred to in the art as "finger sacks." It is to be understood that reference to "glove" herein thus refers to a covering for any or all of a portion of a wearer's hand, including the wearer's thumb and/or one or more fingers, and including "finger sacks."

I. Multi-Layer Gloves

Generally, the present invention is directed to disposable gloves constructed of a thermoplastic material comprising a blend of two or more ethylene-based polymers and one or more surface modification agents. The thermoplastic materials are typically constructed or formed into a thin film. Films manufactured from the thermoplastic material of the present invention are characterized by significantly improved toughness, tear strength, and heat seal strength compared to conventional polyolefin films known in the art. The thermoplastic materials may be constructed through different extrusion processes such as casting or blowing mold into a thin thermoplastic film of which the structure of the film comprises two or more layers. The one or more surface modification agents are incorporated into the layers of the films in varying proportions, thereby providing films characterized by significant differences in surface texture for both sides of the film.

Various embodiments of the present invention are directed to disposable gloves constructed of more than one film prepared from a thermoplastic material comprising ethylene-based polymers. FIG. 1 generally depicts a glove 1 of the present invention constructed of a first film 3 and a second film 5. As a general matter, the thermoplastic material used to prepare the films comprises a high performance, conventional or single-site metallocene-linear low density polyethylene (m-LLDPE) and one or more additional ethylene-based polymers selected from a second metallocene-linear low density polyethylene (m-LLDPE), an ethylene-vinyl acetate copolymer (EVA), a linear low density polyethylene (LLDPE), or any combination thereof, plus optional additives such as surface modification agents.

Figure 2:
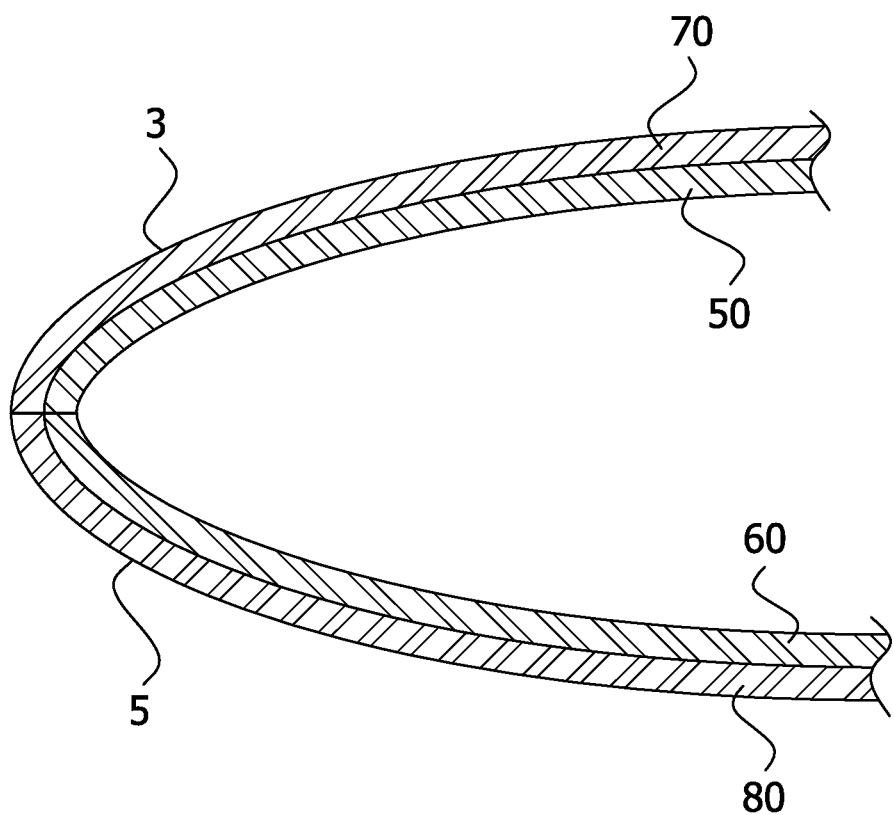
FIG. 2 depicts a cross-sectional view of glove construction material of the present invention in the form of a multilayer film including inner and outer layers.

Generally, the films include an inner, or internal layer that contacts the wearer's hand and an outer, or external layer that contacts the item(s) grasped by the wearer. FIG. 2 provides a cross-sectional view of first film 3 and second film 5 of the glove of FIG. 1. As shown in FIG. 2, the first film 3 and second film 5 include inner layers 50 and 60, respectively that will be in contact with the wearer's hand. First film 3 and second film 5 also include outer layers 70 and 80, respectively, that will come in contact with the item to be grasped or handled. The internal layer can be formulated, e.g., having a slippery, or other structure to provide better hand feel. The feel of the inner layer can also be controlled by adjusting the coefficient of friction of the layer. The external layer can be formulated, e.g., having a sticky, or other structure to provide grip feel and improved gripping ability. The feel of the outer layer can also be controlled by adjusting the coefficient of friction of the layer.

A. Inner and Outer Layers

Generally, the inner and outer layers are constructed of thermoplastic material comprising a high performance, conventional or single-site metallocene-linear low density polyethylene (m-LLDPE) and one or more additional ethylene-based polymers selected from a second metallocene-linear low density polyethylene (m-LLDPE), an ethylene-vinyl acetate copolymer (EVA), a linear low density polyethylene (LLDPE), or any combination thereof has the properties of a thermoplastic elastomer. A thermoplastic elastomer, in the context of the present invention, denotes a low modulus, highly flexible, and highly elastic material comprising two or more ethylene-based polymers in such intimate contact so as to form reversible, non-covalent cross-links such as by hydrogen bonding, dipole, or van der Waal's interactions. Intimate mixing of the two or more polymers may be accomplished by means known in the art, for example, casting extrusion, and blow molding extrusion.

In some embodiments, the thermoplastic material of an inner or outer layer comprises a metallocene-linear low density polyethylene (m-LLDPE) and an ethylene-vinyl acetate copolymer (EVA). In some embodiments, the thermoplastic material of an inner or outer layer comprises a combination of a metallocene-linear low density polyethylene (m-LLDPE) and a linear low density polyethylene (LLDPE). In some embodiments, the thermoplastic material of an inner or outer layer comprises a combination of a first metallocene-linear low density polyethylene (m-LLDPE) and a second metallocene-linear low density polyethylene (m-LLDPE). In some embodiments, the thermoplastic material comprises a combination of a first metallocene-linear low density polyethylene (m-LLDPE), a second metallocene-linear low density polyethylene (m-LLDPE), and an ethylene-vinyl acetate copolymer (EVA). In some embodiments, the thermoplastic material of an inner or outer layer comprises a combination of a first metallocene-linear low density polyethylene (m-LLDPE), a second metallocene-linear low density polyethylene (m-LLDPE), and a linear low density polyethylene (LLDPE). In some embodiments, the thermoplastic material of an inner or outer layer comprises a combination of a metallocene-linear low density polyethylene (m-LLDPE), an ethylene-vinyl acetate copolymer (EVA), and a linear low density polyethylene (LLDPE). In some embodiments, the thermoplastic material of an inner or outer layer comprises a combination of a first metallocene-linear low density polyethylene (m-LLDPE), a second metallocene-linear low density polyethylene (m-LLDPE), an ethylene-vinyl acetate copolymer (EVA), and a linear low density polyethylene (LLDPE).

It has been surprisingly found that the thermoplastic material comprising two or more ethylene-based polymers not only gives the excellent heat seal strength and lower heat seal temperature but also offer the film with toughness, tear strength, and excellent dexterity which will offer better functionality than conventional disposable polyolefin films.

In various embodiments, the thermoplastic material of an inner or outer layer comprising two or more ethylene-based polymers comprises a high performance, conventional or single-site metallocene-linear low density polyethylene (m-LLDPE). M-LLDPE is so-named due to the metallocene catalyst that catalyzes the polymerization of ethylene. The m-LLDPE has a density within the range of about 0.86 grams per cubic centimeter to about 0.92 grams per cubic centimeter, such as between about 0.87 grams per cubic centimeter to about 0.905 grams per cubic centimeter. Density may be measured by ASTM D792. The m-LLDPE has a melt index (MI) within the range of about 0.5 decigrams (dg)/min to about 5.0 dg/min, such as between about 1.0 dg/min to about 2.0 dg/min. The method for determining the melt index is described in the standards ASTM D1238 and ISO 1133.

M-LLDPE polymers provide excellent tear strength, toughness, and elasticity. Elasticity in the thermoplastics field is generally determined by a combination of tensile strength at yield and tensile elongation at break. In the context of the present invention, the thermoplastic material is characterized by low tensile strength at yield and high tensile elongation at break. Yield point is the point on the stress-strain curve, where the slope of the curve becomes zero. Tensile strength at yield reflects the stress at this point in the stress-strain curve. Tensile strength at yield may be measured at both the machine direction (MD) orientation and the transverse direction (TD) orientation. Break point is the point at which the material ruptures. Tensile elongation at break is the percentage increase in length before it breaks under tension. Tensile elongation may be measured at both the machine direction (MD) orientation and the transverse direction (TD) orientation. Both quantities are measured according to the standard set forth in ASTM D882. Metallocene-LLDPE having densities near or below about 0.9 g/cm$^3$ are preferred since they tend to provide excellent elastic recovery in terms of low tensile strength at yield and high tensile elongation at break. That is, it is preferred to prepare the thermoplastic material of the present invention with an elastomeric m-LLDPE since the elastic recovery property is a distinct advantage of this component of the combination to the elasticity of the final resultant thermoplastic elastomer. The properties provided by the relatively low density of the ethylene-based polymer gloves provide advantages over gloves constructed of other conventional materials including, for example, polyurethane-based gloves.

The thermoplastic material used to prepare an inner and/or outer layer and the resulting multi-layer films of the present invention preferably comprises a relatively low density m-LLDPE having a tensile strength at yield (MD) that is no more than about 14 MPa (about 2000 psi), no more than about 10 MPa (about 1450 psi), or even no more than about 8.5 MPa (about 1200 psi). Preferably, the tensile strength at yield (TD) is no more than about 14 MPa (about 2000 psi), no more than about 10 MPa (about 1450 psi), or even no more than about 6.9 MPa (about 1000 psi).

Preferably, the tensile elongation (MD) at break is at least 400%, at least 500%, or at least 600%. Preferably, the tensile elongation (TD) at break is at least 400%, at least 500%, or at least 600%.

Preferred m-LLDPE polymers exhibit excellent tear strength, as measured by the Elmendorf test method ASTM D 1922 (2 mil/50 micrometer sample) in both the machine direction (MD) orientation and the transverse direction (TD) orientation. Preferably, the tear strength (MD) is at least 350 grams, at least about 450 grams, or even at least about 500 grams. Preferably, the tear strength (TD) is at least about 500 grams, at least about 600 grams, or even at least at least about 700 grams.

Toughness may be measured by the Dart Impact, ASTM D1709 standard (2-4 mils/50-100 microns sample). Falling dart impact is a traditional method for evaluating the impact strength or toughness of a plastic film. This test uses a single dart configuration and a single drop height, while varying the weight of the dart. Preferably, the toughness of the m-LLDPE as measured by the falling dart impact is at least about 700 grams, or even at least about 800 grams.

The thermoplastic material comprising two or more ethylene-based polymers generally comprises between about 30 wt. % and about 75 wt. % of the m-LLPDE component, such as between about 35 wt. % and about 65 wt. %, or even between about 45 wt. % and about 65 wt. %. In some embodiments, the thermoplastic material generally comprises between about 30 wt. % and about 50 wt. % m-LLDPE polymer.

M-LLDPE polymers are available commercially, such as Versify™ 3401 Elastomer and Plastomer polymers available from Dow Chemical, AFFINITY PL series, e.g., 1880G and 1881G, from The Dow Chemical Company too.

In some embodiments, the thermoplastic material of the inner and/or outer layers of the films of the present invention comprises a copolymer comprising ethylene and vinyl acetate (VA) repeat units. In general, the weight percent of the vinyl acetate repeat units in the ethylene-vinyl acetate (EVA) copolymer weight percent may range from about 5 wt. % to about 40 wt. %, preferably between about 9 wt. % and about 20 wt. %, the balance being ethylene. In some embodiments, the VA content may be higher, such as between about 25 wt. % and about 40 wt. %, such as between about 30 wt. % and about 35 wt. %. In general, the EVA copolymer has a density from about 0.920 grams per cubic centimeter to about 0.950 grams per cubic centimeter, such as from about 0.930 grams per cubic centimeter to about 0.940 grams per cubic centimeter. Density may be measured by ASTM D1505. The EVA copolymer has a melt index (MI) from about 1.0 dg/min to about 5.0 dg/min. The melt index may be measured by ASTM D1238.

EVA copolymers provide excellent processability, low temperature sealing, and chemical resistance. Advantageously, EVA copolymers are very elastic, as measured by tensile strength at yield and tensile elongation at break, both under the ASTM D638 standard. The EVA copolymer may have a tensile strength at yield (ASTM D638) of less than about 80 kg/cm² (about 8 MPa), less than about 70 kg/cm² (about 7 MPa), or even less than 50 kg/cm² (about 5 MPa). Preferably, the EVA polymer is characterized by tensile elongation at break (ASTM D638), which may be at least 600%, at least 700%, or even at least 800%. The EVA co-polymer is therefore an advantageous component of the thermoplastic material due to its excellent elastomeric properties, as measured by low tensile strength at yield and high elongation at break. Therefore, it is preferred to prepare the thermoplastic material of the present invention with an elastomeric EVA copolymer since the elastic recovery property is a distinct advantage of this component to the elasticity of the final resultant thermoplastic elastomer.

In certain embodiments, the thermoplastic material of these embodiments generally comprises between about 30 wt. % and about 70 wt. % EVA copolymer, more preferably between about 30 wt. % and about 50 wt. % EVA copolymer.

EVA copolymers are available commercially, such as TAI-SOX® EVA copolymers, available from Formosa Plastics Corporation, ELVAX® EVA copolymers, available from DuPont, and Tritheva® EVA copolymers, available from Petroquimica Triunfo.

In these and other embodiments, the thermoplastic material of the inner and/or outer layers of the films of the present invention comprises a linear low density polyethylene (LLDPE). Linear low-density polyethylene (LLDPE) is a substantially linear polymer (polyethylene), with significant numbers of short branches, commonly made by copolymerization of ethylene with longer-chain olefins, such as butene, hexene, or octene. Preferred LLDPE polymer comprise ethylene-based polymer copolymerized with butene. The LLDPE has a density within the range of about 0.83 grams per cubic centimeter to about 0.925 grams per cubic centimeter, such as between about 0.85 grams per cubic centimeter to about 0.90 grams per cubic centimeter. Density may be measured by ASTM D1505. The LLDPE has an MI within the range of about 0.25 dg/min to about 2.0 dg/min, such as between about 0.45 dg/min to about 1.0 dg/min. The melt index may be measured by ASTM D1238.

LLDPE polymers are chosen to enhance the toughness, tear strength, and stretchability of the thermoplastic material. LLDPE polymers are characterized by tensile elongation (MD) at break is at least 300%, at least 400%, or at least 500%. Preferably, the tensile elongation (TD) at break is at least 500%, at least 600%, or at least 700%. LLDPE polymers are additionally an economical additive. In some embodiments, the thermoplastic material generally comprises between about 30 wt. % and about 50 wt. % LLDPE polymer and in other embodiments between about 10 wt. % and about 30 wt. % LLDPE polymer.

LLDPE polymers are available commercially, such as the Formolene L42099 polymers available from Formosa Plastics.

The films resulting from the combination of ethylene-based polymer layers generally have a thickness of at least about 5 μm and typically from about 5 to about 40 μm or from about 20 to about 30 μm.

B. Surface Modification Agents

As noted, various embodiments of the invention are directed to disposable gloves that include a relatively smooth surface of an inner, donning layer and a relatively tacky surface of an exterior, grasping layer. These properties are provided by incorporating one or more surface modification agents into the inner and outer layers of the multilayer films used to prepare the disposable gloves. Suitable surface modification agents for this purpose include slip additives and anti-block additives. In this manner, the inner and outer layers of the films used to construct the disposable gloves are modified by virtue of the presence of one or more components (i.e., are chemically modified). Other methods used to adjust the surface properties of thermoplastic materials include roughening of the surface of the material by, for example, embossing the surfaces of the material during manufacture. Gloves of the present invention may include embossed inner and outer surfaces. However, adjustment of surface properties by selection of film additives as described herein as the at least primary and often only mode of surface modification is preferred since modification by roughening or embossing of the glove construction material may negatively impact glove strength. For example, when surfaces are roughened by embossing, the texture surface will often change when the glove is subjected to temperature conditions that are higher than the embossing temperature.

A slip additive is a plastics modifier that acts as a lubricant by exuding to the surface of the plastic during and immediately after processing to reduce friction between layers of film. Lower friction facilitates handling of the film and other surfaces, e.g., rollers, to which the film comes into contact. Slip additives are generally fatty materials, such as, for example, long chain fatty acids, alcohols, and amides. Preferred slip additives are fatty amides having carbon chains generally ranging from 14 to 22 carbon atoms, such as from 15 to 19 carbon atoms. In various embodiments, the slip additive is selected from the group consisting of oleamide, stearic amide, and combinations thereof.

An antiblock additive is a plastics modifier that is generally added to prevent blocking, which occurs when two adjacent layers of film adhere together when pressed together, such as during windup on a roll or film stacking. Antiblock additives are added to form micro-bumps on the surface of a plastic film, which minimizes film to film contact. Antiblock additives may be inorganic materials, such as natural silica particles, talc, synthetic silica, calcium carbonate, ceramic spheres, kaolin/clay, and mica. Organic antiblock additives include ethylene bisstearamide, stearyl erucamide, stearamide, erucamide, glycerol monostearate, zinc stearate, silicone, and PTFE.

Generally, the thermoplastic material of the present invention may comprise between about 1 wt. % and about 10 wt. % of surface modification agents, such as between about 5 wt. % and about 10 wt. % of surface modification agents. Preferably, the thermoplastic material comprises both an anti-block additive and a slip additive as surface modification agents. Thus, generally the thermoplastic material preferably comprises between about 1 wt. % and about 10 wt. %, such as between about 5 wt. % and about 10 wt. % of an anti-block additive. In addition, the thermoplastic material preferably further comprises between about 1 wt. % and about 10 wt. %, such as between about 5 wt. % and about 10 wt. % of a slip additive.

To impart the relatively smooth inner surface and relatively tacky outer surface, preferably the inner layers include a greater proportion of surface modification agent than the outer layers. For example, typically the ratio of the total proportion of surface modification agent(s) in the inner layers to the total proportion of surface modification agent(s) in the outer layers is at least about 1.5:1 (wt. %/wt. %), typically at least about 2:1 (wt. %/wt. %), and preferably at least about 2.5:1 (wt. %/wt. %).

Typically, the inner layer(s) include the surface modification agent(s) in a total proportion of from about 3 wt. % to about 20 wt. % (e.g., from about 3 wt. % to about 10 wt. %) and, more typically, from about 5 wt. % to about 20 wt. % (e.g., from about 5 wt. % to about 10 wt. %). In accordance with such embodiments, typically the inner layer(s) include an anti-block additive in a proportion of from about 1 wt. % to about 10 wt. % (e.g., about 5 wt. %) or from about 5 wt. % to about 10 wt. % (e.g., about 7 wt. %). The inner layer(s) also typically include the slip additive in a proportion of from about 1 wt. % to about 10 wt. % (e.g., about 5 wt. %), or from about 5 wt. % to about 10 wt. % (e.g., about 7 wt. %).

The outer layer(s) typically include the surface modification agent(s) in a total proportion of from about 1 wt. % to about 5 wt. %, or from about 1 wt. % to about 3 wt. %. In accordance with such embodiments, typically the outer layer(s) include an anti-block additive in a total proportion of from about 1 wt. % to about 5 wt. % or from about 1 wt. % to about 3 wt. %. The outer layer(s) typically include the slip additive in a proportion of from about 1 wt. % to about 5 wt. %, or from about 1 wt. % to about 3 wt. %.

Incorporating the surface modification agent(s) into the inner layer(s) and outer layer(s) and providing the relatively smooth inner, donning surface of the glove and the relatively tacky exterior, grasping surface of the glove provide inner and outer surfaces of varying coefficients of friction (COF). Typically, the COF of the inner surface(s), or inner layer(s) is less than about 0.3 or from about 0.1 to about 0.3 (e.g., about 0.1). The COF of the outer surface(s) or outer layer(s) is at least about 0.5 or from about 0.5 to about 1.0. These varying coefficients of friction can also be evidenced by the relative COFs of the inner and outer surfaces. For example, typically the ratio of the COF of the outer surface to the inner surface is at least 1:1, more typically at least about 1.5:1 (e.g., about 2:1).

C. Exemplary Embodiments

In one preferred embodiment, the thermoplastic material of the inner and outer layer(s) comprises between about 30 wt. % to about 70 wt. % m-LLDPE and between about 30 wt. % to about 70 wt. % of the EVA copolymer. The thermoplastic material of the inner layer(s) may comprise between about 5 wt. % and about 10 wt. % of an anti-block additive and/or may comprise between about 5 wt. % and about 10 wt. % of a slip additive. Further in accordance with this embodiment, the thermoplastic material of the outer layer(s) may comprise between about 1 wt. % and about 5 wt. % of an anti-block additive and/or may comprise between about 1 wt. % and about 5 wt. % of a slip additive.

In another preferred embodiment, the thermoplastic elastomer of the inner and outer layer(s) comprises about 40 wt. % m-LLDPE and about 40 wt. % of the EVA copolymer, the balance being optional additives such as anti-block and slip additives. For example, the thermoplastic material of the inner layer(s) comprises between about 5 wt. % and about 10 wt. % of an anti-block additive and/or between about 5 wt. % and about 10 wt. % of a slip additive. The thermoplastic material of the outer layer(s) comprises between about 1 wt. % and about 5 wt. % of an anti-block additive and/or between about 1 wt. % and about 5 wt. % of a slip additive.

In another preferred embodiment the thermoplastic material of the inner and outer layer(s) comprises between about 35 wt. % and about 65 wt. % m-LLDPE, and between about 15 wt. % and about 45 wt. % LLDPE. The thermoplastic material of the inner layer(s) may comprise between about 5 wt. % and about 10 wt. % of an anti-block additive and/or between about 5 wt. % and about 10 wt. % of a slip additive. Further in accordance with this embodiment, the thermoplastic material of the outer layer(s) may comprise between about 1 wt. % and about 5 wt. % of an anti-block additive and/or may comprise between about 1 wt. % and about 5 wt. % of a slip additive.

In another preferred embodiment, the thermoplastic elastomer of the inner and outer layer(s) comprises between about 30 wt. % and about 55 wt. % of a first m-LLDPE, and between about 30 wt. % and about 55 wt. % of a second m-LLDPE. The thermoplastic material of the inner layer(s) may comprise between about 5 wt. % and about 10 wt. % of an anti-block additive and/or between about 5 wt. % and about 10 wt. % of a slip additive. Further in accordance with this embodiment, the thermoplastic material of the outer layer(s) may comprise between about 1 wt. % and about 5 wt. % of an anti-block additive and/or may comprise between about 1 wt. % and about 5 wt. % of a slip additive.

In another preferred embodiment, the thermoplastic elastomer of the inner and outer layer(s) comprises between about 30 wt. % to about 50 wt. % of the EVA copolymer, between about 10 wt. % and about 30 wt. % LLDPE, and between about 30 wt. % and about 50 wt. % m-LLDPE. The thermoplastic material of the inner layer(s) may comprise between about 5 wt. % and about 10 wt. % of an anti-block additive and/or between about 5 wt. % and about 10 wt. % of a slip additive. Further in accordance with this embodiment, the thermoplastic material of the outer layer(s) may comprise between about 1 wt. % and about 5 wt. % of an anti-block additive and/or may comprise between about 1 wt. % and about 5 wt. % of a slip additive.

D. Middle Layer

Figure 3:
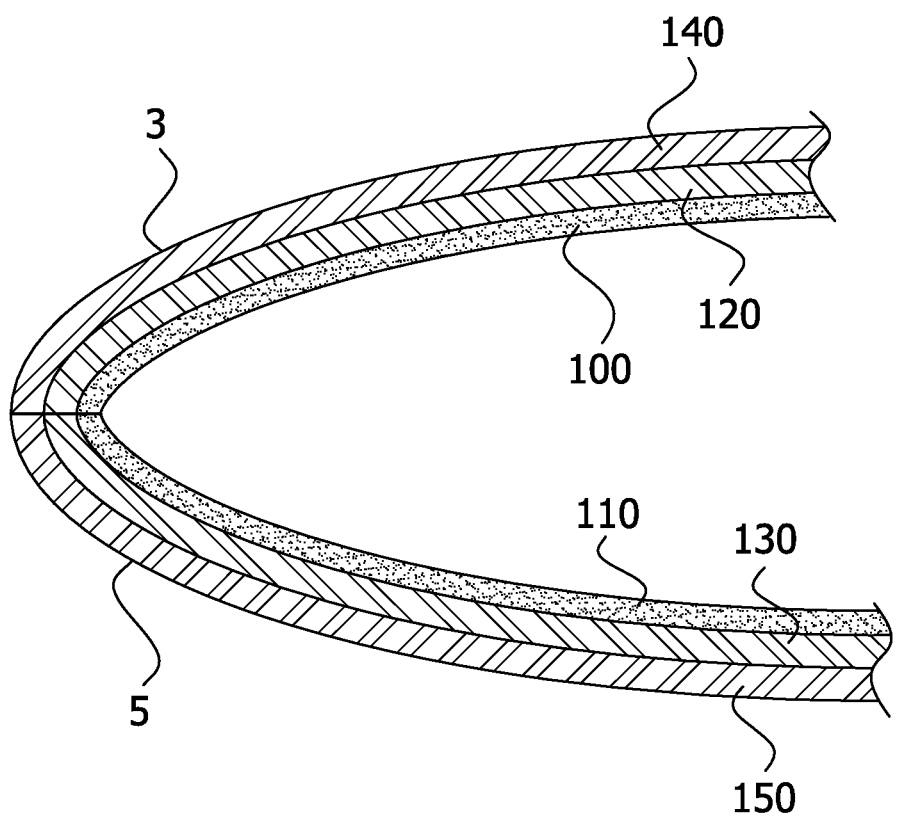
FIG. 3 depicts a cross-sectional view of glove constructions material of the present invention in the form a multilayer film including inner, middle, and outer layers.

Further in accordance with the foregoing, in various preferred embodiments, the multilayer films of thermoplastic material further comprise a middle layer disposed between the inner and outer layer of a multilayer film used to form the disposable glove. FIG. 3 provides a cut-away view of a portion of the glove depicted in FIG. 1 and provide a cross-sectional view of the first film 3 and second film 5. First film 3 and second film 5 include inner layers 100 and 110, respectively, and also include outer layers 140 and 150, respectively. Disposed between the inner and outer layers, first film 3 and second film 5 includes middle layers 120 and 130, respectively. The middle layers provide strength characteristics to the multilayer films. They also impede, or prevent any substantial migration of the surface modification agents between the inner and outer layers. In this manner, the middle layer contributes to maintaining the desired smooth inner surface and tacky exterior. Although preferred in various embodiments, it is to be understood that multilayer films that include only inner and outer layers and do not include a separate and distinct middle layer nonetheless provide films that provide disposable gloves having a suitably smooth inner surface and tacky exterior surface. Generally, a middle layer may be incorporated into a thermoplastic film including inner and outer layers of the properties discussed above including, in particular, the above-noted Exemplary Embodiments. Advantageously, the middle layer may be constructed of material discarded during glove manufacture including, for example, material discarded after heat sealing and forming gloves from one or more multilayer films.

The middle layer is prepared from a thermoplastic material comprising ethylene-based polymers. Typically, the thermoplastic material of the middle layer comprises a high performance, conventional or single-site metallocene-linear low density polyethylene (m-LLDPE). The middle layer may also comprise one or more additional ethylene-based polymers selected from a second metallocene-linear low density polyethylene (m-LLDPE), an ethylene-vinyl acetate copolymer (EVA), and/or a linear low density polyethylene (LLDPE).

A middle layer may also include one or more additives including, for example, fillers and/or other mineral additives.

The thickness of any middle layer is typically at least about 10 μm to provide the desired effects noted above, but also typically no more than about 30 μm so as to not provide a film thicker than desired. Thus, the thickness of the middle layer is generally from about 10 μm to about 30 μm and typically from about 15 μm to about 25 μm.

E. Additional Components

In addition to the above-described components, the thermoplastic material utilized in the present invention may include additional and optional components. It is not practical to presently envision and describe all potential independent additives such as perfumes, dyes, etc. The list is nearly endless considering the variety of potential functionalities. For example, in addition to the above-noted surface modification agents other components can include, for example, UV inhibitors, colorants, and fillers, and others as are known in the plastic film industry.

In alternative embodiments, the material of the invention consists essentially of the components and optional additives described herein in that non-recited components that would materially affect the basic and novel properties are excluded. And in further alternatives, the material of the invention more strictly consists of the recited components and optional additives.

Similarly, various embodiments of the present invention exclude the presence of other materials commonly used to prepare disposable gloves. Certain embodiments of the present invention are directed to HDPE-free gloves, latex-free gloves, nitrile-free, vinyl-free, and polyurethane-free gloves. For example, in some embodiments the content of one or more of these is strictly limited to no more than 5 wt % (e.g., up to 5% HDPE, or up to 5% HDPE and 5% vinyl), or even no more than 2 wt % or 1 wt %. Other embodiments are essentially or alternatively absolutely, HDPE-free, latex-free, nitrile-free, vinyl-free, and/or polyurethane-free. In fact, various embodiments of the present invention are directed to vinyl-free gloves that nonetheless exhibit the advantageous use and strength characteristics of vinyl gloves, but prepared from lower-cost ethylene-based polymers. For example, the combination of the tensile strength properties (e.g., a tensile strength at yield (MD) and/or tensile strength at yield (TD) of no more than 14 MPa (about 2000 psi) and a tensile elongation at break (MD) and a tensile elongation at break (TD) of at least 500%) represent an advance over gloves constructed of other conventional materials including, for example, polyurethane-based gloves. Further in accordance with the present invention, ethylene polymer-based, vinyl-free gloves exhibit various advantageous features as compared to vinyl-based gloves, including one or more of the following: (i) a tensile strength at yield (MD) of less than about 20 MPa; and/or (ii) a tensile strength at yield (TD) of less than about 20 MPa; and/or (iii) a tensile strength at break (MD) of less than about 40 MPa; (iv) a tensile strength at break (TD) of less than about 30 MPa; (v) a tensile elongation at break (MD) of at least about 700%; and/or (vi) a tensile elongation at break (TD) of at least about 800%; and/or (vii) a tear strength (MD) of at least about 1 g/μm; and/or (viii) a tear strength (TD) of at least about 2 g/μm; and/or (ix) dart impact test results conducted in accordance with ASTM D1709 of at least about 10 g/μm; and/or (x) COFs of the exposed surfaces of the first inner layer and second inner layer is from about 0.1 to about 0.5; and/or (xi) COFs of the exposed surfaces of the first outer layer and second outer layer is from about 0.1 to about 0.5.

II. Methods of Preparation

The present invention is further directed to methods for preparing thin films from the thermoplastic elastomer materials discussed above. The film is then further processed into disposable gloves. The gloves may be manufactured via processes such as casting into lightweight films (Cast film) or being blown into lightweight films (blown films). In general, one sheet of film is folded and the resulting dual sheet is heat sealed to form the gloves. Alternatively, two sheets of film prepared from the thermoplastic elastomer of the present invention may be seamed and heat sealed to form gloves. Advantageously, by virtue of incorporation of surface modification agents that provide easier donning ability, the methods of the present invention allow for preparation of gloves that are non-powdered (i.e., powder-free).

Given the economy of heat sealing compared to other methods of making gloves, a preferred method of manufacture of disposable gloves is by heat sealing. In another aspect, therefore, the present invention is directed to a method of manufacturing the film into an article, the method comprising heat sealing two layers of film. In one preferred embodiment, two layers of film are heat sealed and die cut into a multi-layer article, for example, disposable plastic gloves. Accordingly, there is provided an improved article, e.g., plastic glove, comprising two films of thin thermoplastic material of the present invention bonded to one another along a seal line conforming generally to the required finger and hand outline of the required glove. In general, the method of manufacture comprises folding a film double as it is drawn off the roll, with the line of the fold in the machine direction, then passing the double layer of plastic into a reciprocating heat seal and cut out die, where the glove seams are made and the glove is cut out, all in one single, rapid motion.

In preparing the film comprising the thermoplastic elastomer, the process comprises a first step of combining all component polymers and optional additives for a particular layer in a continuous gravimetric blender which has several compartments for individual components. The components at all compartments are continuously fed and mixed into the blender according to the desired percentage weight which is controlled by load cells. Blenders for this process are commercially available, for example, from K-Tron Process Group or Foremost Machine.

The components are blended through the continuous gravimetric blender which has several individual compartments depending on the formulation and process requirement. Through gravity conveying, the blender provides a precise homogenous blend of materials. Process controls are determined at the time of blending and generally depend upon the mass of material added, the relative weight percent of each component, and the blender.

The blended compound of an individual layer is loaded into an extruder hopper. The blended material in the hopper is gravimetrically conveyed into the feeding zone of the extruder.

The heart of the extrusion process is an extruder which consists of a screw and a die head (spiral mandrel). The extruder is essentially a machine used to melt the plastic and deliver the melted plastic under pressure to a die. Typically, extrusion begins with granular material, gravity-fed via a hopper to a rotary screw. The screw is a raised flighted helix that traps material and moves it forward through an enclosed, heated barrel where it is first melted, and then pressurized. The extruder accomplishes solids conveying, melting or plasticating, mixing, melt conveying, degassing, and shaping or forming by, for example, an extruder die.

The blended thermoplastic material is then extruded through a casting or blown die to convert the molten plastics into a thin film, the thin film having a thickness of at least about 12.5 micrometers (at least about 0.5 mil) and a surface area of at least about 25 cm$^2$, although typically, the surface area of the film is much larger, i.e., on the order of hundreds or even thousands of cm$^2$. The optimum set of operating conditions can be determined through experience with a particular extruder. Optimum running conditions require the proper balancing of many variables such as:

Screw design including pump ratio, compressional ratio, Flight depth, Flight height, etc.
Extruder size: L/D
Extrusion rate
Extruder conditions (temperatures, pressures, clearances, surface roughness, etc.)
Formulation The present method includes a multiple-layer extrusion method of manufacturing a thermoplastic material comprising two or more ethylene-based polymers and/or high density polyethylene, and surface modifier agents. The process includes extruding two or more materials through a single die with two or more orifices arranged so that the extrudates merge and weld together into a laminar structure before chilling. Each material is fed to the die from a separate extruder, but the orifices may be arranged so that each extruder supplies two or more plies of the same material. For example, in the case of a film including an inner layer, middle layer, and outer layer, three extruders are utilized, one for each layer. Coextrusion can be employed in film blowing, free film extrusion, and extrusion coating processes. The advantage of coextrusion is that each ply of the laminate imparts a desired characteristic property, such as stiffness, heat-sealability, impermeability or resistance to some environment, all of which properties would be impossible to attain with any single material.

The enhanced structural and physical properties of each layer material can be taken advantage of dividing each individual layer into two or more separate layers. A multilayer film is stronger than a monolayer film of the same thickness. Correspondingly, a co-extruded film has higher melt strength and can be produced at a higher output rate with better stability. Advantageously, the multilayer films of the present invention exhibit higher melt strengths than other, for example, HDPE-based films. These higher melt strengths aid in processability. Incorporating more layers with dedicated extruders gives more flexibility and saves money. For instance, an elastomeric skin layer can be split into two layers by substituting a less expensive commodity resin for a high-cost elastomeric resin in the bulk of the skin and still achieve the excellent sealing properties of the elastomer. By adding more layers to the structure in this way, the film is made stronger, more economical and flexible.

The film thickness is controlled by the speed of a take-off or nip roll. The take-off speed may be adjusted to fine-tune the sheet thickness. The finished film gauge is typically at least about 12 micrometers (at least about 0.5 mil), and generally vary from about 20 micrometers and about 200 micrometers (between about 0.8 mil and about 8 mil), such as from about 25 micrometers and about 50 micrometers (between about 1 mil and about 2 mil). The density of the thermoplastic material is generally less than about 0.925 g/cm$^3$ and in some embodiments may be less than about 0.91 g/cm$^3$, or even less than about 0.90 g/cm$^3$. The film gradually cools down through a series of leading rolls which may have temperature control to reduce the film temperature to the ambient temperature before winding. The film may be rolled into a master roll prior to the article manufacture process (e.g., fold, cut, and seal process for manufacturing disposable gloves).

For casting the film into an article, the extruded thin film is then folded double as it is drawn off the roll, with the line of the fold in the machine direction. The double layers of plastic are then passed into a reciprocating heat seal and cut out die, where the seams of the article are defined to thereby define an article, e.g., a glove, having a surface area of at least about 25 cm$^2$. The article is heat sealed and cut out, all in one single, rapid motion. For blown film, the film bubble can be directly heat sealed and die cut off without the folding process.

Heat sealing is the thermal fusion of two (or more) melt-bond compatible thermoplastic materials. All heat seals require the precise control of heat, dwell time, and pressure to create a quality weld. These process controls are determined at the time of sealing. In general, the seal initial temperature for preparing an article, e.g., a disposable glove, is generally less than 100° C., such as between about 80° C. and 90° C., which compares favorably to the seal initial temperatures of conventional polyolefin films employing high density polyethylene, which are generally above 125° C. Thermal Impulse heat sealing is the process of welding thermoplastic films together by means of a resistance ribbon(s) through a cycle of heating and cooling under pressure. By controlling the rate of heating and cooling, superior welds are created without sacrificing the physical property values of the original film. Thermal impulse techniques are used to make bags, lay flat tubing, medical packaging, large panels, and protective garments.

The thermoplastic material of the present invention combines the prominent advantages of latex, nitrile, high density polyethylene (HDPE), and vinyl. The thermoplastic materials of the present invention are further advantageous since they are easier to prepare than materials made from latex, nitrile, HDPE, and vinyl. For example, compared to processes for preparing articles such as disposable gloves from HDPE, the process for preparing articles using the thermoplastic material of the present invention have shorter cycle time and lower seal temperature. Articles manufactured from latex, vinyl, and nitrile are manufactured by the dipping mold process, which is substantially slower than the heat-seal-die cut method for preparing articles from the thermoplastic material of the present invention.

III. Glove Characteristics

As can be seen by the below examples, the thermoplastic material of the present invention, which are manufactured from two or more ethylene-based polymers, yield articles having mechanical properties such as dexterity and tear strength that are much better than polyethylene articles currently on the market. Gloves of the present invention also exhibit strength characteristics at least comparable to other types of disposable gloves, including vinyl-based gloves while overcoming disadvantages of these gloves (e.g., high material costs). For example, disposable gloves manufactured from films prepared from thermoplastic elastomer of the present invention are particularly elastic, having tensile strength at yield (MD) of no more than about 10 MPa (about 1450 psi), tensile strength at yield (TD) of no more than about 10 MPa (about 1450 psi), tensile elongation at break (MD) of at least about 500%, and tensile elongation at break (TD) of at least about 700%.

Preferably, the tensile strength at yield (MD) is no more than about 14 MPa (about 2000 psi), no more than about 10 MPa (about 1450 psi), or even no more than about 6.9 MPa (about 1000 psi), such as between about 4.2 MPa (about 600 psi) and 14 MPa (about 2000 psi). Preferably, the tensile strength at yield (TD) is no more than about 14 MPa (about 2000 psi), no more than about 10 MPa (about 1450 psi), or even no more than about 6.9 MPa (about 1000 psi), such as between about 4.2 MPa (about 610 psi) and 14 MPa (about 2000 psi). The tensile strength at yield may be measured by ASTM D882.

The tensile elongation at break (MD) may be at least about 500%, at least about 600%, at least about 700%, or even at least about 800%. The tensile elongation at break (TD) may be at least about 700%, at least about 800%, at least about 900%, or even at least about 1000%. Tensile elongation at break is measured by ASTM D882.

Incorporation of surface modification agents modify the film surface structure or roughness and, thus, the resulting surface structure of roughness prepared from such films as measured by the coefficient of friction (COF) of glove surfaces. COF is a measure of the relative difficulty with which one surface will slide over an adjoining surface. The greater the resistance to sliding the higher the COF value The C.O.F. may be measured by ASTM D1894-78.

In various embodiments, the thermoplastic material of the internal surface of gloves of the present invention has a coefficient of friction of less than about 0.3 and a coefficient of friction of the external surface of the gloves of the present invention of at least about 0.5. The C.O.F. may be measured by ASTM D1894-78.

The thermoplastic material of the present invention is further characterized by better tear strength than conventional polyolefin films. In this regard, the tear strength (MD) is generally at least about 1.6 g/micrometer (about 40 g/mil), at least about 2.0 g/micrometer (about 50 g/mil), at least about 2.4 g/micrometer (about 60 g/mil), or even at least about 2.8 g/micrometer (about 70 g/mil), according to ASTM D1922. In some embodiments, the tear strength (MD) is between about 2.0 g/micrometer (about 50 g/mil) and about 3.1 g/micrometer (about 80 g/mil).

Additionally, since they are made from polyethylene materials, the thermoplastic elastomers are non-allergenic, environmentally-friendly, and more economical than articles manufactured from latex, vinyl, and nitrile.

Glove construction material, and gloves, of the present invention typically have a thickness of from about 15 to about 75 μm, or from about 40 to about 60 μm. Advantageously, gloves within these thickness ranges (e.g., about 50 μm) provide strength characteristics in excess of gloves of comparable thickness prepared from other materials (e.g., HDPE).

IV. Color Gloves

Various embodiments of the present invention incorporate a coloring agent. Thus, various embodiments are directed to disposable gloves constructed of ethylene-based polymers that include a coloring agent. In various embodiments, the present invention is directed to a disposable glove comprising a first polymer flat film and a second polymer flat film heat-sealed to each other in which the first flat film is a different color from the second flat film. Accordingly, in various embodiments, a first film comprises a coloring agent which imparts a first color to the first film and the second film is free of any coloring agent which would impart the first color. The coloring agent can be selected and utilized to indicate the right- or left-handedness of the glove, the size of the glove, or the presence of one or more additives. For example, the coloring agent may indicate the presence of an additive selected from the group consisting of a skin protectant, an anti-bacterial agent, a scent, a degradability enhancing additive, and combinations thereof.

Figure 4:
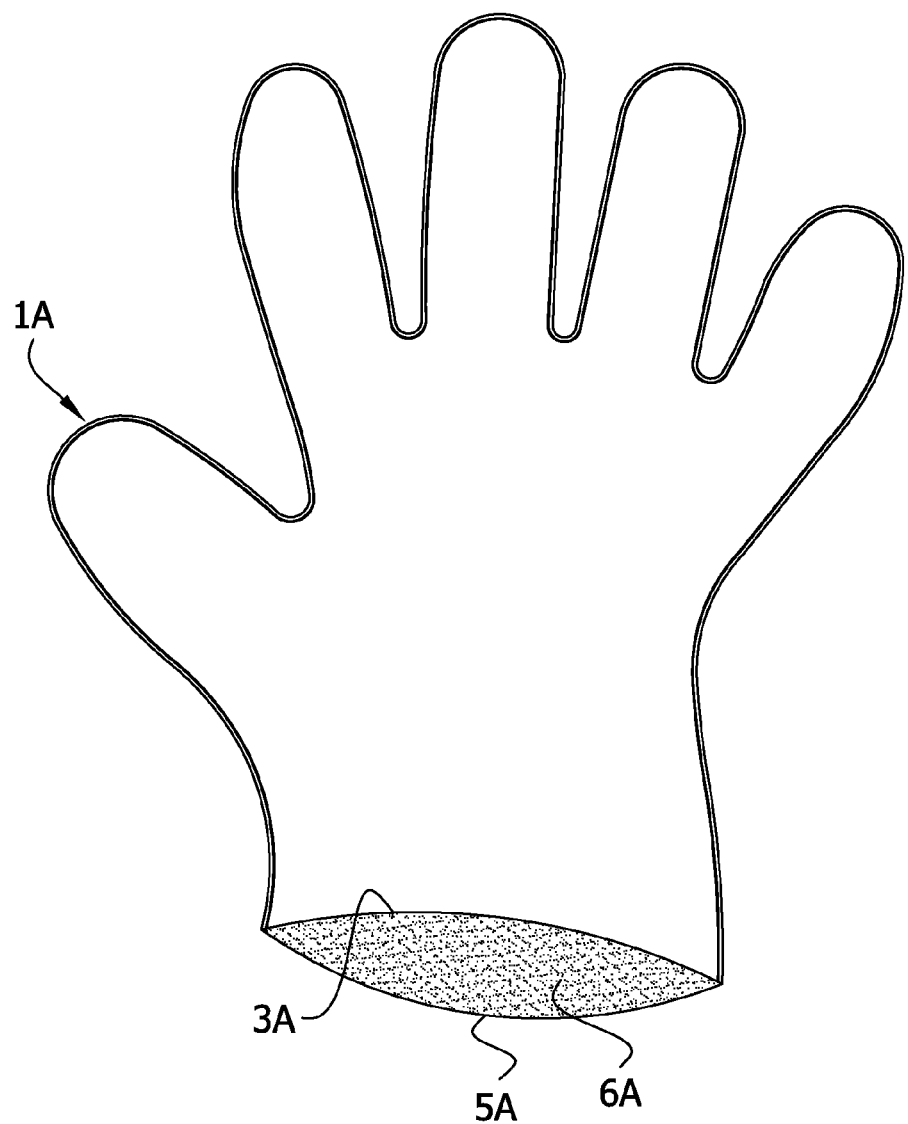
FIG. 4 depicts a glove of the present invention incorporating a coloring agent.

Generally, the coloring agent is incorporated into one of the films comprising the glove construction material. That is, the coloring agent is incorporated into the film used to prepare the surface of the glove that contacts the palm of the wearer's hand or the film used to prepare the surface that contacts the back surface of the wearer's hand. FIG. 4 depicts a glove 1A including a first film 3A and a second film 5A, with a coloring agent 6A incorporated into the material of second film 5A. The coloring agent can be incorporated into either an inner or outer layer of a multilayer film, or an optional middle layer. The selection of the layer into which the coloring agent is incorporated is not narrowly critical.

Multilayer films for use in preparing color gloves of the present invention are generally prepared by the coextrusion methods detailed herein. However, since the coloring agent is typically only incorporated into one of the films of the glove construction material, color gloves of the present invention are typically prepared from two separate sheets of multilayer films that are heat-sealed to form the gloves.

Suitable coloring agents include those generally known in the art suitable for use with polymer-based materials including, for example, low density polyethylene (LDPE), pigments, and color-imparting additives including, for example, coloring agents commercially available from PolyOne, AmTopp, and NPC. The coloring agent is typically incorporated in a concentration such that the coloring agent constitutes at least about 0.1 wt. %, at least about 3 wt. %, from about 0.1 wt. % to about 10 wt. %, or from about 3 wt. % to about 10 wt. % of the film. Additionally or alternatively, the coloring agent typically constitutes at least about 0.1 wt. %, at least about 3 wt. %, from about 0.1 wt. % to about 10 wt. %, or from about 3 wt. % to about 10 wt. % of the layer into which it is incorporated.

As noted, the coloring agent can indicate the size of the glove or the right- or left-handedness of the glove. The coloring agent can also indicate the presence of an additive, including an additive selected from the group consisting of a skin protectant, an anti-bacterial agent, a degradability enhancing additive, and combinations thereof.

In one preferred embodiment of the invention, the glove is made from a first film and a second film which are heat sealed together as described above, and a coloring agent is incorporated into just one of the two films. In the final glove, therefore, the palm side of the glove has a coloring agent and the backhand side of the glove does not have a coloring agent; or the palm side of the glove has a coloring agent and the backhand side of the glove does not have a coloring agent. In these embodiments as well as in the following embodiments, the coloring agent imparts a color to the glove which is blue, aqua, pink, rose, red, yellow, green, or gold. In other embodiments, other colors are used. In an alternative embodiment, there is a coloring agent in both sides such as a first coloring agent in the palm side of the glove and a second coloring agent in the backhand side of the glove, wherein the second coloring agent is different from the first coloring agent. So in this embodiment, one side of the glove is a first color and the other side of the glove is a second. As is evident from the foregoing, in all of these embodiments the gloves are essentially flat and are made from two flat films heat-sealed together where the two films have a color contrast between them, be it either color versus no color, or one color versus another color. This contrast is important in that it provides the contrast depicted, for example, between 3A and 5A in FIG. 4. This contrast, when the glove is closed and flat, assists the user in opening the glove for use. In particular, to open a flat glove can often require peeling apart the two films, and having the films be contrasting in color makes it easier for the user to peel the one film off the other, and into an open position.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

Having described the invention in detail, it will be apparent that modifications and variations are possible without departing from the scope of the invention defined in the appended claims.

EXAMPLES

The following non-limiting examples are provided to further illustrate the present invention.

Each example was below was prepared according to the above-described process and pressed into a disposable glove.

Example 1

Two multilayer films of thermoplastic elastomers according to the present invention were prepared including inner, middle, and outer layers comprising the following components and concentrations in wt. %:
(Inner Layers)
  30-50 wt. % metallocene-linear low density polyethylene (m-LLDPE, VERSIFY 3401 available from The Dow Chemical Company);
  30-50 wt. % metallocene-linear low density polyethylene (m-LLDPE, AFFINITY PL 1880G available from The Dow Chemical Company);
  5-10 wt. % slip additive (oleamide); and
  5-10 wt. % antiblock additive (synthetic silica)
(Middle Layer)
  100 wt. % LLDPE (L42009 available from Formosa Plastics Corp.
(Outer Layers)
  40-60 wt. % metallocene-linear low density polyethylene (m-LLDPE, VERSIFY 3401 available from The Dow Chemical Company);
  40-60 wt. % metallocene-linear low density polyethylene (m-LLDPE, AFFINITY PL 1880G available from The Dow Chemical Company);
  1-10 wt. % slip additive (oleamide); and
  1-10 wt. % antiblock additive (synthetic silica)

For each of the multilayer films, the above-described components were blended to form the inner, middle, and outer layers and the layers were co-extruded using separate extruders to form a multilayer thin film that was folded, heat sealed, and cut into a disposable glove. The disposable glove prepared from the above-described combination was subjected to various standard tests and compared to (1) a commercially available glove ("PE glove" in the Tables) made from a combination of linear low density polyethylene and high density polyethylene and a (2) commercially available vinyl glove. The results of those tests are shown below in Tables 1A (International System Units) and 1B (US Customary/Imperial Units).

TABLE 1A

International System Units

| Composition Test Item | Unit | Example 1 Combination Value | PE glove | Vinyl Glove | Test Method |
|---|---|---|---|---|---|
| Gauge (Calculated) | μm | 55.82 | 10.00 | 50.00 | |
| Density | g/cm$^3$ | 0.921 | 0.945 | 1.25 | |
| Tensile Strength at Yield (MD) | MPa | 6.1 | 23.7 | 6.7 | ASTM D882 |
| Tensile Strength at Yield (TD) | MPa | 5.8 | N/A | 5.3 | ASTM D882 |
| Tensile Strength at break (MD) | MPa | 20.0 | 40.4 | 12.4 | ASTM D882 |
| Tensile Strength at break (TD) | MPa | 17.3 | 25.2 | 9.7 | ASTM D882 |
| Tensile Elongation at Break (MD) | % | 770 | 290 | 600 | ASTM D882 |
| Tensile Elongation at Break (TD) | % | 840 | 590 | 295 | ASTM D882 |
| Tear Strength (MD) | grams/μm | 5.68 | 0.23 | 12.6 | ASTM D1922 |
| Tear Strength (TD) | grams/μm | 10.65 | 10.6 | 13.6 | ASTM D1922 |
| Dart Impact | grams/μm | 9.9 | <1.0 | NA | ASTM D1709 |
| COF O/O (Static) | NA | 0.152 | <0.1 | <0.1 | ASTM D1894 |
| COF I/I (Static) | NA | 0.182 | <0.1 | <0.1 | ASTM D1894 |
| Seal Temperature | °C. | 80-90 | 125-130 | NA | |

TABLE 1B

U.S. Customary/Imperial Units

| Composition Test Item | Unit | Example 1 Combination Value | PE glove | Vinyl Glove | Test Method |
|---|---|---|---|---|---|
| Gauge (Calculated) | mil | 2.2 | 0.40 | 2 | |
| Density | oz/in$^3$ | 0.5251 | 0.5462 | 0.723 | |
| Tensile Strength at Yield (MD) | psi | 784 | 3429 | 969 | ASTM D882 |
| Tensile Strength at Yield (TD) | psi | 1089 | N/A | 763 | ASTM D882 |
| Tensile Strength at break (MD) | psi | 2897 | 5860 | 1800 | ASTM D882 |
| Tensile Strength at break (TD) | psi | 2501 | 3650 | 1400 | ASTM D882 |
| Tensile Elongation at Break (MD) | % | 770 | 290 | 600 | ASTM D882 |

TABLE 1B-continued

| | U.S. Customary/Imperial Units | | | | |
|---|---|---|---|---|---|
| Composition | Example 1 Combination | | PE | Vinyl | Test |
| Test Item | Unit | Value | glove | Glove | Method |
| Tensile Elongation at Break (TD) | % | 840 | 590 | 295 | ASTM D882 |
| Tear Strength (MD) | grams/mil | 144 | 5.8 | 160 | ASTM D1922 |
| Tear Strength (TD) | grams/mil | 270 | 265.3 | 172 | ASTM D1922 |
| Dart Impact | grams/mil | 251 | <250 | NA | ASTM D1709 |
| COF O/O (Static) | NA | 0.152 | <0.1 | <0.1 | ASTM D1894 |
| COF I/I (Static) | NA | 0.182 | <0.1 | <0.1 | ASTM D1894 |
| Seal Temperature | ° C. | 80-90 | 125-130 | NA | |

Example 2

Two multilayer films of thermoplastic elastomers according to the present invention were prepared including inner, middle, and outer layers comprising the following components and concentrations in wt. %:

(Inner Layers)
- 30-50 wt. % metallocene-linear low density polyethylene (m-LLDPE, VERSIFY 3401 available from The Dow Chemical Company);
- 30-50 wt. % metallocene-linear low density polyethylene (m-LLDPE, AFFINITY PL 1880G available from The Dow Chemical Company);
- 5-10 wt. % slip additive (oleamide); and
- 5-10 wt. % antiblock additive (synthetic silica)

(Middle Layer)
- 100 wt. % LLDPE (L42009 available from Formosa Plastics Corp.

(Outer Layers)
- 40-60 wt. % metallocene-linear low density polyethylene (m-LLDPE, VERSIFY 3401 available from The Dow Chemical Company);
- 40-60 wt. % metallocene-linear low density polyethylene (m-LLDPE, AFFINITY PL 1880G available from The Dow Chemical Company);
- 1-5 wt. % slip additive (oleamide); and
- 1-5 wt. % antiblock additive (synthetic silica)

For each of the multilayer films, the above-described components were blended to form the inner, middle, and outer layers and the layers were co-extruded using separate extruders to form a multilayer thin film that was folded, heat sealed, and cut into a disposable glove. The disposable glove prepared from the above-described combination was subjected to various standard tests and compared to the above-mentioned commercially available glove made from a combination of linear low density polyethylene and high density polyethylene and the above-mentioned commercially-available vinyl glove. The results of those tests are shown below in Tables 2A (International System Units) and 2B (US Customary/Imperial Units).

TABLE 2A

| | International System Units | | | | |
|---|---|---|---|---|---|
| Composition | Example 2 Combination | | PE | Vinyl | Test |
| Test Item | Unit | Value | glove | Glove | Method |
| Gauge (Calculated) | μm | 57.08 | 10.00 | 50.00 | |
| Density | g/cm$^3$ | 0.921 | 0.945 | 1.25 | |
| Tensile Strength at Yield (MD) | MPa | 6.1 | 23.7 | 6.7 | ASTM D882 |
| Tensile Strength at Yield (TD) | MPa | 5.8 | N/A | 5.3 | ASTM D882 |
| Tensile Strength at break (MD) | MPa | 21.2 | 40.4 | 12.4 | ASTM D882 |
| Tensile Strength at break (TD) | MPa | 15.9 | 25.2 | 9.7 | ASTM D882 |
| Tensile Elongation at Break (MD) | % | 849 | 290 | 600 | ASTM D882 |
| Tensile Elongation at Break (TD) | % | 781 | 590 | 295 | ASTM D882 |
| Tear Strength (MD) | grams/μm | 2.2 | 0.23 | 12.6 | ASTM D1922 |
| Tear Strength (TD) | grams/μm | 14.2 | 10.6 | 13.6 | ASTM D1922 |
| Dart Impact | grams/μm | 18.2 | <10 | NA | ASTM D1709 |
| COF O/O (Static) | NA | 0.331 | <0.1 | <0.1 | ASTM D1894 |
| COF I/I (Static) | NA | 0.188 | <0.1 | <0.1 | ASTM D1894 |
| Seal Temperature | ° C. | 80-90 | 125-130 | NA | |

TABLE 2B

| | U.S. Customary/Imperial Units | | | | |
|---|---|---|---|---|---|
| Composition | Example 2 Combination | | PE | Vinyl | Test |
| Test Item | Unit | Value | glove | Glove | Method |
| Gauge (Calculated) | mil | 1.1 | 0.40 | 2 | |
| Density | oz/in$^3$ | 0.5324 | 0.5462 | 0.723 | |

TABLE 2B-continued

U.S. Customary/Imperial Units

| Composition Test Item | Unit | Example 2 Combination Value | PE glove | Vinyl Glove | Test Method |
|---|---|---|---|---|---|
| Tensile Strength at Yield (MD) | psi | 880 | 3429 | 969 | ASTM D882 |
| Tensile Strength at Yield (TD) | psi | 841 | N/A | 763 | ASTM D882 |
| Tensile Strength at break (MD) | psi | 3068 | 5860 | 1800 | ASTM D882 |
| Tensile Strength at break (TD) | psi | 2313 | 3650 | 1400 | ASTM D882 |
| Tensile Elongation at Break (MD) | % | 849 | 290 | 600 | ASTM D882 |
| Tensile Elongation at Break (TD) | % | 781 | 590 | 295 | ASTM D882 |
| Tear Strength (MD) | grams/mil | 56 | 5.8 | 160 | ASTM D1922 |
| Tear Strength (TD) | grams/mil | 358.5 | 265.3 | 172 | ASTM D1922 |
| Dart Impact | grams/mil | 460 | <250 | NA | ASTM D1709 |
| COF O/O (Static) | NA | 0.331 | <0.1 | <0.1 | ASTM D1894 |
| COF I/I (Static) | NA | 0.188 | <0.1 | <0.1 | ASTM D1894 |
| Seal Temperature | °C. | 80-90 | 125-130 | NA | |

Example 3

Two multilayer films of thermoplastic elastomers according to the present invention were prepared including inner, middle and outer layers comprising the following components and concentrations in wt. %:

(Inner Layers)
- 30-50 wt. % metallocene-linear low density polyethylene (m-LLDPE, VERSIFY 3401 available from The Dow Chemical Company);
- 30-50 wt. % metallocene-linear low density polyethylene (m-LLDPE, AFFINITY PL 1880G available from The Dow Chemical Company);
- 5-10 wt. % slip additive (oleamide); and
- 5-10 wt. % antiblock additive (synthetic silica)

(Middle Layer)
- 100 wt. % LLDPE (L42009 available from Formosa Plastics Corp.

(Outer Layers)
- 40-60 wt. % metallocene-linear low density polyethylene (m-LLDPE, VERSIFY 3401 available from The Dow Chemical Company);
- 40-60 wt. % metallocene-linear low density polyethylene (m-LLDPE, AFFINITY PL 1880G available from The Dow Chemical Company);
- 1-5 wt. % slip additive (oleamide); and
- 1-5 wt. % antiblock additive (synthetic silica)

For each of the multilayer films, the above-described components were blended to form the inner, middle, and outer layers and the layers were co-extruded using separate extruders to form a multilayer thin film that was folded, heat sealed, and cut into a disposable glove. The disposable glove prepared from the above-described combination was subjected to various standard tests and compared to the above-noted commercially-available glove made from a combination of linear low density polyethylene and high density polyethylene and the above-noted commercially available vinyl glove. The results of those tests are shown below in Tables 3A (International System Units) and 3B (US Customary/Imperial Units).

TABLE 3A

International System Units

| Composition Test Item | Unit | Example 3 Combination Value | PE glove | Vinyl Glove | Test Method |
|---|---|---|---|---|---|
| Gauge (Calculated) | μm | 51.0 | 10.00 | 50.00 | |
| Density | g/cm³ | 0.891 | 0.945 | 1.25 | |
| Tensile Strength at Yield (MD) | MPa | 4.8 | 23.7 | 6.7 | ASTM D882 |
| Tensile Strength at Yield (TD) | MPa | 4.3 | N/A | 5.3 | ASTM D882 |
| Tensile Strength at Break (MD) | MPa | 15.6 | 40.4 | 12.4 | ASTM D882 |
| Tensile Strength at Break (TD) | MPa | 16.1 | 25.2 | 9.7 | ASTM D882 |
| Tensile Elongation at Break (MD) | % | 716 | 290 | 600 | ASTM D882 |
| Tensile Elongation at Break (TD) | % | 816 | 590 | 295 | ASTM D882 |
| Tear Strength (MD) | grams/μm | 5.1 | 0.23 | 12.6 | ASTM D1922 |
| Tear Strength (TD) | grams/μm | 9.9 | 10.6 | 13.6 | ASTM D1922 |
| Dart Impact | grams/μm | 12.5 | <10 | NA | ASTM D1709 |
| COF O/O (Static) | NA | 0.759 | <0.1 | <0.1 | ASTM D1894 |
| COF I/I (Static) | NA | 0.172 | <0.1 | <0.1 | ASTM D1894 |
| Seal Temperature | °C. | 80-90 | 125-130 | NA | |

TABLE 3B

U.S. Customary/Imperial Units

| Composition<br>Test Item | Unit | Example 3 Combination<br>Value | PE glove | Vinyl Glove | Test Method |
|---|---|---|---|---|---|
| Gauge (Calculated) | mil | 2.0 | 0.40 | 2 | |
| Density | oz/in³ | 0.5150 | 0.5462 | 0.723 | |
| Tensile Strength at Yield (MD) | psi | 689 | 3429 | 969 | ASTM D882 |
| Tensile Strength at Yield (TD) | psi | 617 | N/A | 763 | ASTM D882 |
| Tensile Strength at Break (MD) | psi | 2254 | 5860 | 1800 | ASTM D882 |
| Tensile Strength at Break (TD) | psi | 2338 | 3650 | 1400 | ASTM D882 |
| Tensile Elongation at Break (MD) | % | 716 | 290 | 600 | ASTM D882 |
| Tensile Elongation at Break (TD) | % | 816 | 590 | 295 | ASTM D882 |
| Tear Strength (MD) | grams/mil | 131.6 | 5.8 | 160 | ASTM D1922 |
| Tear Strength (TD) | grams/mil | 253.2 | 265.3 | 172 | ASTM D1922 |
| Dart Impact | grams/mil | 319 | <250 | NA | ASTM D1709 |
| COF O/O (Static) | NA | 0.759 | <0.1 | <0.1 | ASTM D1894 |
| COF I/I (Static) | NA | 0.172 | <0.1 | <0.1 | ASTM D1894 |
| Seal Temperature | ° C. | 80-90 | 125-130 | NA | |

Example 4

Two multilayer films of thermoplastic elastomers according to the present invention were prepared including inner, middle, and outer layers comprising the following components and concentrations in wt. %:
(Inner Layers)
  30-50 wt. % metallocene-linear low density polyethylene (m-LLDPE, VERSIFY 3401 available from The Dow Chemical Company);
  30-50 wt. % metallocene-linear low density polyethylene (m-LLDPE, AFFINITY PL 1880G available from The Dow Chemical Company);
  5-10 wt. % slip additive (oleamide); and
  5-10 wt. % antiblock additive (synthetic silica)
(Outer/Middle)
  48 wt. % AFFINITY PL 1880G available from The Dow Chemical Company);
  48 wt. % metallocene-linear low density polyethylene (m-LLDPE, VERSIFY™ 3401 available from The Dow Chemical Company);
  0-5 wt. % slip additive (oleamide); and
  0-5 wt. % antiblock additive (synthetic silica or Talc)

For each of the multilayer films, the above-described components were blended to form the inner, middle, and outer layers and the layers were co-extruded using separate extruders to form a multilayer thin film that was folded, heat sealed, and cut into a disposable glove. The disposable glove prepared from the above-described combination was subjected to various standard tests and compared to the above-noted commercially available glove made from a combination of linear low density polyethylene and high density polyethylene and the above-noted commercially available vinyl glove. The results of those tests are shown below in Tables 4A (International System Units) and 4B (US Customary/Imperial Units).

TABLE 4A

International System Units

| Composition<br>Test Item | Unit | Example 4 Combination<br>Value | PE glove | Vinyl Glove | Test Method |
|---|---|---|---|---|---|
| Gauge (Calculated) | μm | 60.6 | 10.00 | 50.00 | |
| Density | g/cm³ | 0.905 | 0.945 | 1.25 | |
| Tensile Strength at Yield (MD) | MPa | 3.6 | 23.7 | 6.7 | ASTM D882 |
| Tensile Strength at Yield (TD) | MPa | 3.5 | N/A | 5.3 | ASTM D882 |
| Tensile Strength at Break (MD) | MPa | 20.9 | 40.4 | 12.4 | ASTM D882 |
| Tensile Strength at Break (TD) | MPa | 17.8 | 25.2 | 9.7 | ASTM D882 |
| Tensile Elongation at Break (MD) | % | 832 | 290 | 600 | ASTM D882 |
| Tensile Elongation at Break (TD) | % | 849 | 590 | 295 | ASTM D882 |
| Tear Strength (MD) | grams/μm | 4.62 | 0.23 | 12.6 | ASTM D1922 |
| Tear Strength (TD) | grams/μm | 8.34 | 10.6 | 13.6 | ASTM D1922 |
| Dart Impact | grams/μm | >14.4 | <10 | NA | ASTM D1709 |
| COF O/O (Static) | NA | 1.275 | <0.1 | <0.1 | ASTM D1894 |
| COF I/I (Static) | NA | 0.185 | <0.1 | <0.1 | ASTM D1894 |
| Seal Temperature | ° C. | 80-90 | 125-130 | NA | |

TABLE 4A

| | | U.S. Customary/Imperial Units | | | |
|---|---|---|---|---|---|
| Composition | | Example 4 Combination | PE | Vinyl | Test |
| Test Item | Unit | Value | glove | Glove | Method |
| Gauge (Calculated) | mil | 2.38 | 0.40 | 2 | |
| Density | oz/in$^3$ | 0.5231 | 0.5462 | 0.723 | |
| Tensile Strength at Yield (MD) | psi | 520 | 3429 | 969 | ASTM D882 |
| Tensile Strength at Yield (TD) | psi | 507 | N/A | 763 | ASTM D882 |
| Tensile Strength at Break (MD) | psi | 3029 | 5860 | 1800 | ASTM D882 |
| Tensile Strength at Break (TD) | psi | 2582 | 3650 | 1400 | ASTM D882 |
| Tensile Elongation at Break (MD) | % | 832 | 290 | 600 | ASTM D882 |
| Tensile Elongation at Break (TD) | % | 849 | 590 | 295 | ASTM D882 |
| Tear Strength (MD) | grams/mil | 117.6 | 5.8 | 160 | ASTM D1922 |
| Tear Strength (TD) | grams/mil | 212.5 | 265.3 | 172 | ASTM D1922 |
| Dart Impact | grams/mil | >367 | <250 | NA | ASTM D1709 |
| COF O/O (Static) | NA | 1.275 | <0.1 | <0.1 | ASTM D1894 |
| COF I/I (Static) | NA | 0.185 | <0.1 | <0.1 | ASTM D1894 |
| Seal Temperature | ° C. | 80-90 | 125-130 | NA | |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

It should be understood that the present invention is not limited to any particular construction or technique for making the glove although various structures and techniques for forming thermoplastic materials have been described above. For example, the layers described above may not be utilized in all occasions. Additionally, other layers not specifically referred to above may be utilized in the present invention.

What is claimed is:

1. A disposable glove comprising:
a glove construction material in the shape of a glove adapted for receiving a thumb, fingers, and/or a hand therein, and comprising a plurality of ethylene-based polymer layers, the glove construction material comprising:
(a) a first film having a thickness of from about 5 to about 40 μm and comprising:
(i) a coloring agent which imparts a first color to the first film,
(ii) a first inner layer comprising (I) a first metallocene-linear low density polyethylene (m-LLDPE), and (II) at least one ethylene-based polymer selected from the group consisting of a second metallocene-linear low density polyethylene (m-LLDPE), an ethylene-vinyl acetate copolymer (EVA), a linear low density polyethylene (LLDPE), and combinations thereof, the first inner layer comprising at least about 60 wt. % m-LLDPE;
(iii) a first outer layer comprising (I) a first metallocene-linear low density polyethylene (m-LLDPE), and (II) at least one ethylene-based polymer selected from the group consisting of a second metallocene-linear low density polyethylene (m-LLDPE), an ethylene-vinyl acetate copolymer (EVA), a linear low density polyethylene (LLDPE), and combinations thereof; the first outer layer comprising at least about 80 wt. % m-LLDPE; and
(iiia) a first middle layer disposed between and in contact with the unexposed surface of the first inner layer and the unexposed surface of the first outer layer, the first middle layer consisting essentially of a linear low density polyethylene (LLDPE) and optional additives selected from one or more fillers and/or one or more mineral additives, wherein the LLDPE is the only polymer component of the first middle layer;
wherein the composition of the first inner layer, first middle layer, and first outer layer are different; and
(b) a second film having a thickness of from about 5 to about 40 μm and comprising:
(iv) a second inner layer comprising (I) a first metallocene-linear low density polyethylene (m-LLDPE), and (II) at least one ethylene-based polymer selected from the group consisting of a second metallocene-linear low density polyethylene (m-LLDPE), an ethylene-vinyl acetate copolymer (EVA), a linear low density polyethylene (LLDPE), and combinations thereof, the second inner layer comprising at least about 60 wt. % m-LLDPE;
(v) a second outer layer comprising (I) a first metallocene-linear low density polyethylene (m-LLDPE), and (II) at least one ethylene-based polymer selected from the group consisting of a second metallocene-linear low density polyethylene (m-LLDPE), an ethylene-vinyl acetate copolymer (EVA), a linear low density polyethylene (LLDPE), and combinations thereof, the second outer layer comprising at least about 80 wt. % m-LLDPE; and
(vi) a second middle layer disposed between and in contact with the unexposed surface of the second inner layer and the unexposed surface of the second outer layer, the second middle layer consisting essentially of a linear low density polyethylene (LLDPE) and optional additives selected from one or more fillers and/or one or more mineral additives, the LLDPE is the only polymer component of the second middle layer;

wherein the composition of the second inner layer, second middle layer, and second outer layer are different; and wherein the second film is free of any coloring agent which would impart said first color so that the second film and the first film have a color contrast;

wherein the first film and second film are each flat films heat-sealed to each other with either the first or second film being a palm side film of the glove and the other film being a backhand side film of the glove so said color contrast is a color contrast distinguishing the backhand side film of the glove from the palm side film; and wherein one or more of the first color, and the color contrast between the first and second flat films achieves a function selected from one or more of indicating the right- or left-handedness of the glove, indicating the size of the glove, indicating the presence of one or more additives, and assisting the user in opening the glove.

2. The glove of claim 1, wherein the coloring agent is selected from the group consisting of low density polyethylene (LDPE), pigments, color-imparting additives, and combinations thereof.

3. The glove of claim 1 wherein the coloring agent constitutes from about 0.1 wt. % to about 10 wt. % of the first film.

4. The glove of claim 1 wherein the coloring agent is included in the first inner layer.

5. The glove of claim 1 wherein the coloring agent is included in the first outer layer.

6. The glove of claim 1 wherein the first middle layer of the first film comprises the coloring agent.

7. The glove of claim 1 wherein the coloring agent indicates the size of the glove.

8. The glove of claim 1 wherein the coloring agent indicates the right- or left-handedness of the glove.

9. The glove of claim 1 wherein the first film is adapted for contacting the surface of the palm of the wearer's hand and indicates the hand of the wearer for which the glove is adapted.

10. The glove of claim 1 wherein the first film is adapted for contacting the surface of the back of the wearer's hand and indicates the hand of the wearer for which the glove is adapted.

11. The glove of claim 1 wherein the coloring agent indicates the presence of an additive selected from the group consisting of a skin protectant, an anti-bacterial agent, a scent, a degradability enhancing additive, or a combination thereof.

12. The glove of claim 11 wherein the first film comprises a skin protectant.

13. The glove of claim 11 wherein the second film further comprises a skin protectant.

14. The glove of claim 11 wherein the first film further comprises an anti-bacterial agent.

15. The glove of claim 11 wherein the second film further comprises an anti-bacterial agent.

16. The glove of claim 11 wherein the first film further comprises a scent.

17. The glove of claim 11 wherein the second film further comprises a scent.

18. The glove of claim 11 wherein the first film further comprises a degradability enhancing additive.

19. The glove of claim 11 wherein the second film further comprises a degradability enhancing additive.

20. The disposable glove of claim 1, wherein the first inner layer, first outer layer, second inner layer, and second outer layer each include one or more surface modification agents, and wherein the first inner layer includes a greater proportion of surface modification agent(s) than the first outer layer and the second inner layer includes a greater proportion of surface modification agent(s) than the second outer layer.

21. The disposable glove of claim 20 wherein:
the first inner layer comprises between about 5 wt. % and about 10 wt. % of a slip additive and between about 5 wt. % and about 10 wt. % of an anti-block additive, the first outer layer comprising between about 0 and about 5 wt. % of a slip additive and between about 0 and about 5 wt. % of an anti-block additive; and
the second inner layer comprises between about 5 wt. % and about 10 wt. % of a slip additive and between about 5 wt. % and about 10 wt. % of an anti-block additive, the second outer layer comprising between about 0 and about 5 wt. % of a slip additive and between about 0 and about 5 wt. % of an anti-block additive.

22. The disposable glove of claim 21 wherein the first outer layer and the second outer layer each comprises between about 1 wt. % and about 5 wt. % of a slip additive and between about 1 wt. % and about 5 wt. % of an anti-block additive.

23. The disposable glove of claim 1 wherein the second film is free of any coloring agent.

* * * * *